(12) United States Patent
Bitondo et al.

(10) Patent No.: US 8,998,218 B1
(45) Date of Patent: Apr. 7, 2015

(54) SHOPPING CART BOTTOM SHELF MONITOR

(71) Applicants: Steven Salvatore Bitondo, Mamaroneck, NY (US); Steven Michael Bitondo, White Plains, NY (US)

(72) Inventors: Steven Salvatore Bitondo, Mamaroneck, NY (US); Steven Michael Bitondo, White Plains, NY (US)

( * ) Notice: Subject to any disclaimer, the term of this patent is extended or adjusted under 35 U.S.C. 154(b) by 0 days.

(21) Appl. No.: 14/049,698

(22) Filed: Oct. 9, 2013

(51) Int. Cl.
*B62D 39/00* (2006.01)
*B62B 5/00* (2006.01)

(52) U.S. Cl.
CPC ........................................ *B62B 5/00* (2013.01)

(58) Field of Classification Search
CPC ......................................................... B62B 3/14
USPC .............. 280/33.991–33.992, 33.995–33.997
See application file for complete search history.

(56) References Cited

U.S. PATENT DOCUMENTS

| | | |
|---|---|---|
| 4,071,740 A | 1/1978 | Gogulski |
| 4,465,290 A * | 8/1984 | Hooley .................... 280/33.992 |
| 4,623,877 A | 11/1986 | Buckens |
| 5,708,782 A | 1/1998 | Larson et al. |
| 5,754,449 A | 5/1998 | Hoshal et al. |
| 6,189,789 B1 | 2/2001 | Levine et al. |
| 6,486,768 B1 | 11/2002 | French et al. |
| 6,727,810 B1 | 4/2004 | Martin et al. |
| 6,975,205 B1 | 12/2005 | French et al. |
| 2001/0052933 A1 | 12/2001 | Nybo et al. |
| 2002/0079367 A1 | 6/2002 | Montani |
| 2008/0005036 A1 | 1/2008 | Morris |
| 2009/0063176 A1 | 3/2009 | French et al. |

* cited by examiner

*Primary Examiner* — J. Allen Shriver, II
*Assistant Examiner* — Erez Gurari
(74) *Attorney, Agent, or Firm* — Thomas A Gallagher; Gallagher Intellectual Property Law

(57) ABSTRACT

The invention includes a pivoting floor member coupled to the bottom shelf of a shopping cart. The floor member is pivotally arranged so that it assumes a first position when nothing is placed upon it and a second position when any object having more than a predetermined weight is placed upon it. The floor member is mechanically coupled to a mechanical indicator which assumes a first indicating position when the floor member is in its first position and a second indicating position when the floor member is in its second position. The indicator may be a rod and sleeve arrangement and the rod may include indicia such as one or more colored stripes.

14 Claims, 9 Drawing Sheets

SHOPPING CART BOTTOM SHELF MONITOR

BACKGROUND OF THE INVENTION

1. Field of the Invention

The present invention relates generally to theft prevention devices and to methods of using such devices. More particularly, the present invention relates to theft prevention devices that ensure shopping carts are completely emptied at checkout locations. The present invention is particularly, but not exclusively, useful as a theft prevention device that monitors the presence of checkout items on the bottom shelf of the shopping cart.

2. State of the Art

Shoplifting continues to be a major issue for retailers. In fact, more than $13 billion worth of goods are stolen from retailers in the US each year. While shoplifting often connotes clandestine attempts to hide and carry goods out of the store, often goods are stolen in a more patent manner. Specifically, goods may be kept on the bottom shelf of a shopping cart during checkout, and then carried out of the store without being paid for. Due to the non-concealed nature of this act, the shoplifter can allege an innocent mistake if apprehended for theft. This causes particular financial loss for the store especially when such thefts involve expensive goods.

These so-called "bottom of basket losses" occur when items are left on the bottom of a shopping cart and not paid for. This may be due to but not limited to, distracted cashiers/customers or customer intention. A popular proposed solution to this problem is to use an electronic scale to weigh the shopping cart during checkout. Given the known weight of an empty chopping cart, the scale can determine whether there are any goods remaining on the cart during checkout.

U.S. Published Patent Application Number US 2009/0063176 A1 (French et al.) describes a "Shopping Cart Basket Monitor" that includes a scale for determining the end-weight of the cart after all goods are presumably removed at the checkout location. A controller receives the end-weight from the scale. The controller compares the end-weight to the known tare weight of the cart. When the end-weight exceeds the tare weight, the controller creates a signal. The system includes an indicator. In response to the signal, the indicator alerts a cashier to inspect the cart for un-removed goods. During operation of the system, a loaded cart enters the checkout location causing a camera to capture an image of the cart. Further, the cart is weighed by the scale. As goods are removed from the cart, the scale continues to monitor the weight of the cart. When all goods have been presumably removed from the cart, the scale determines the end-weight of the cart. After the end-weight of the cart has been determined, it is communicated to the controller. The controller then compares the end-weight to the known tare weight of the cart. If the end-weight exceeds the tare weight by a predetermined percentage or a value (i.e. cumulative weight decrement), the controller creates a signal that is communicated to the camera and to the indicator. In response to the signal, the indicator alerts the cashier at the checkout location to inspect the cart for un-removed goods. In addition to the camera and cart-weighing components of the system, the system includes a scale mounted at the tabletop of the cashier stand to record the weight of goods before they are bagged. Further, the scale is connected to the controller. As a result, the controller may ensure that all goods placed on the tabletop scale were subjected to completed transactions, i.e., the price of the goods Was first entered into the cash register.

Similar weighing systems have been proposed for use in "self-checkout" environments. U.S. Published Patent Application Number US 2008/0005036 A1 (Morris) describes a "Self-checkout Security System and Method Therefor" where predicted weights of items are used to predict the total order weight. The predicted total order weight is compared to an actual weight of the order based on a weighing of the total order, and an output provided indicating whether the comparison is within acceptable limits or if a security alert for attendant assistance is needed.

U.S. Published Patent Application Number US 2002/0079367 A1 (Montani) describes "Methods and Apparatus for Operating a Self-service Checkout Terminal to Access a Customer Account" where a customer pushes a fully loaded cart into a cart module, a cart bar code is read by scanners (either automatically or by operation by the customer) thereby allowing the weight of the loaded cart and the tare weight of an empty cart present in another cart module to be communicated to a processing unit. Such a determination of the weights of the two carts allows the terminal to ensure that all of the customer's items for purchase are scanned by customer since the terminal may monitor that the item weights of the full cart prior to scanning match the item weights of the full cart after scanning. In the event such item weights do not match, a message will be displayed on a display monitor which prompts the customer for corrective action and/or notify store personnel to assist and/or monitor the customer.

U.S. Pat. No. 6,189,789 B1 (Levine et al.) describes a "Method and System for a Merchandise Checkout System" where the purchaser, upon completion of their purchases, takes their shopping cart to a security station for weighing in on a scale wherein an actual combined weight of the shopping cart, bags and products is compared to a predicted weight determined by a central processor and generating a notification signal if a discrepancy occurs.

A problem common to all of these proposals is that the weighing systems are complicated and expensive. It is therefore an object of the present invention to provide a simple system and method for preventing a non-payment for goods, when the goods are carried in the bottom shelf of a shopping cart to a checkout location. Another object of the present invention is to provide a theft prevention system that alerts a cashier at a checkout location to inspect a presumably empty shopping cart. It is another object of the present invention to provide a theft prevention method and system that is easy to implement, cost effective and simple to use.

SUMMARY OF THE INVENTION

In accord with these objects, which will be discussed in detail below, the invention includes a pivoting floor member coupled to the bottom shelf of a shopping cart. The floor member is pivotally arranged so that it assumes a first position when nothing is placed upon it and a second position when any object having more than a predetermined weight is placed upon it. The floor member is mechanically coupled to a mechanical indicator which assumes a first indicating position when the floor member is in its first position and a second indicating position when the floor member is in its second position.

According to one embodiment, the floor member is a generally trapezoidal piece having a given weight. The piece is mounted on a pivot axis that is located to one side of the center of the piece and the given weight of the piece (and/or the coupled indicator) causes it to assume an angle with one end (the upper end) of the piece located above the pivot axis and the other end (the lower end) of the piece located at or below the pivot axis when viewed in side elevation. According to a first embodiment, the lower end is coupled to a rod and the rod is disposed in a sleeve. The length of the rod and the placement of the sleeve are such that an indicator portion of the rod is hidden inside the sleeve in the first indicating position. When an object is placed on the floor member, the piece pivots on the pivot axis and causes the rod to move through the sleeve to a second indicating position where the indicator portion of the rod is visible.

According to one embodiment, the rod is completely concealed by the sleeve when in the first indicating position and visibly extends from the sleeve when in the second indicating position.

According to another embodiment, the rod is biased away from the sleeve by a spring. For example, the piece is biased into the first position.

In one embodiment, the sleeve is substantially immovably coupled to the shopping cart. According to another embodiment of the invention, the rod and sleeve are interchanged with the sleeve being coupled to the floor member and the rod being coupled to the shopping cart.

The rod and/or sleeve may be provided with indicia such as one or more colored stripes.

A method according to the invention is performed by a cashier at checkout. The indicator is observed to determine whether it is in the first or second indicating position signaling the presence or absence of one or more items on the bottom shelf of the cart. If the indicator signals the presence of one or more items, the cashier removes the item(s) or asks the customer to remove the item(s) for check out.

Additional objects and advantages of the invention will become apparent to those skilled in the art upon reference to the detailed description taken in conjunction with the provided figures.

DETAILED DESCRIPTION

Figure 1:
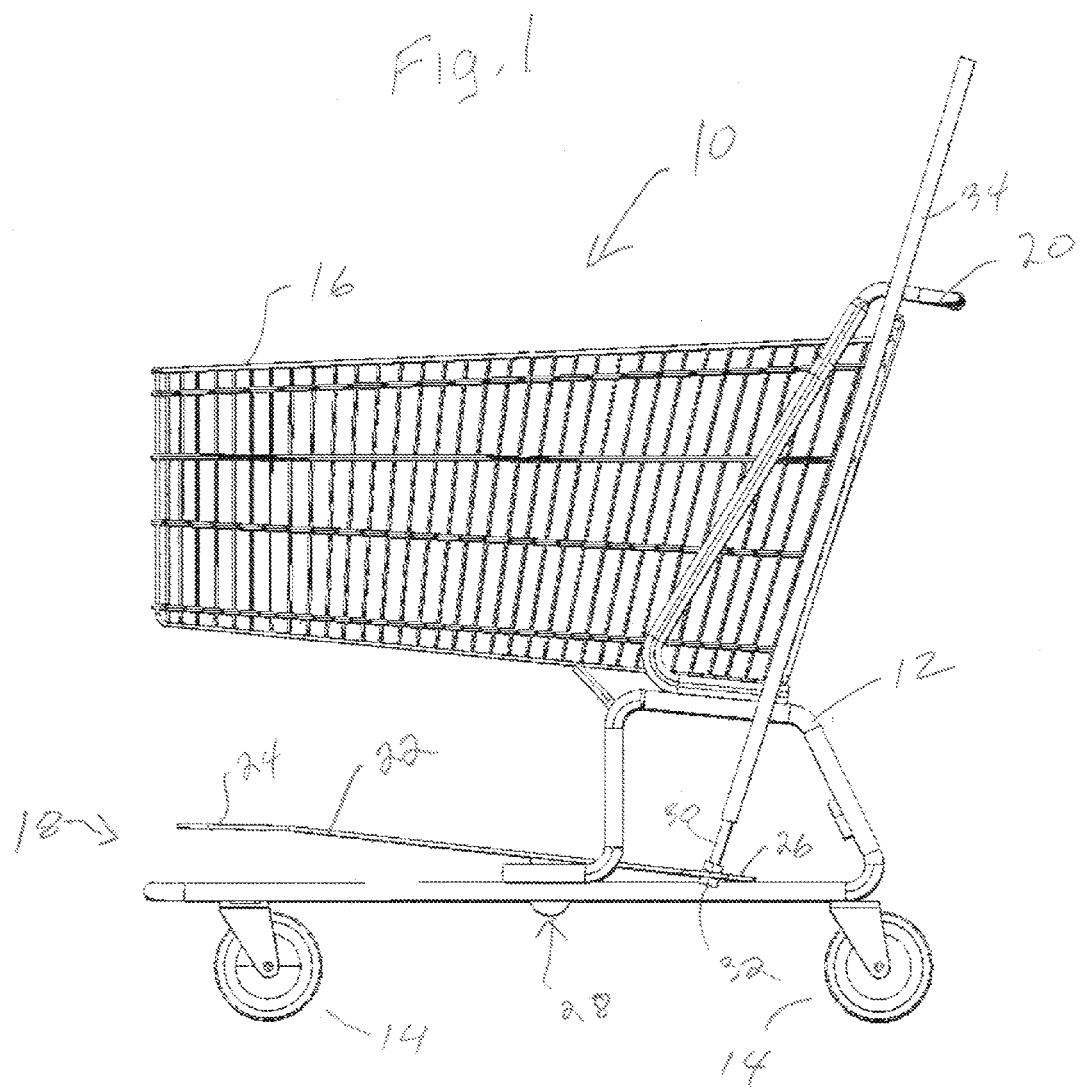
FIG. 1 is a side elevation view of a shopping cart incorporating an embodiment of the invention with nothing on the bottom shelf.

Turning now to FIGS. 1 through 5, a shopping cart 10 includes a frame 12, a plurality of wheels 14 mounted to the lower portion of the frame 12, a basket 16 mounted to the frame 12 above the wheels 14 and a bottom shelf 18 located between the basket 16 and the wheels 14. Usually, the cart 10 is also provided with a pushing handle 20 that is coupled to the frame 12 and may extend up along sides of the frame 12. As seen best in FIGS. 2, 3, and 5, the frame 12 and the basket 16 taper to a narrower front with wheels closer together than in the rear where the pushing handle 20 is mounted. This aids in the "stacking" of carts as shown and described below with reference to FIG. 9.

According to a first embodiment of the invention, the bottom shelf 18 includes a floor member 22 pivotally mounted relative to the frame 12. In particular, the floor member 22 is a generally trapezoidal piece to accommodate the tapering front of the cart described above and seen best in FIGS. 2, 3, and 5. The front end of the piece is preferably provided with a bent portion 24 as illustrated. The rear portion of the piece 22 is provided with a lateral extension 26 seen best in FIGS. 2, 3, and 5. The piece 22 is pivotally mounted to the frame 12 via one or more axle(s) 28. The axle(s) 28 is/are mounted closer to the rear of the piece 22 as illustrated.

According to this first embodiment, a rod 30 is coupled to the lateral extension 26 with a (preferably articulate) coupling 32. A mating sleeve 34 is coupled to the outer portion of the frame 12 (or to the basket 16) and is arranged so that the rod 30 extends into the sleeve 34 as illustrated. The rod 30 has an upper indicator portion 36 seen best in FIGS. 4 and 5. The indicator portion may be provided with indicia such as one or more colored stripes.

Figure 2:
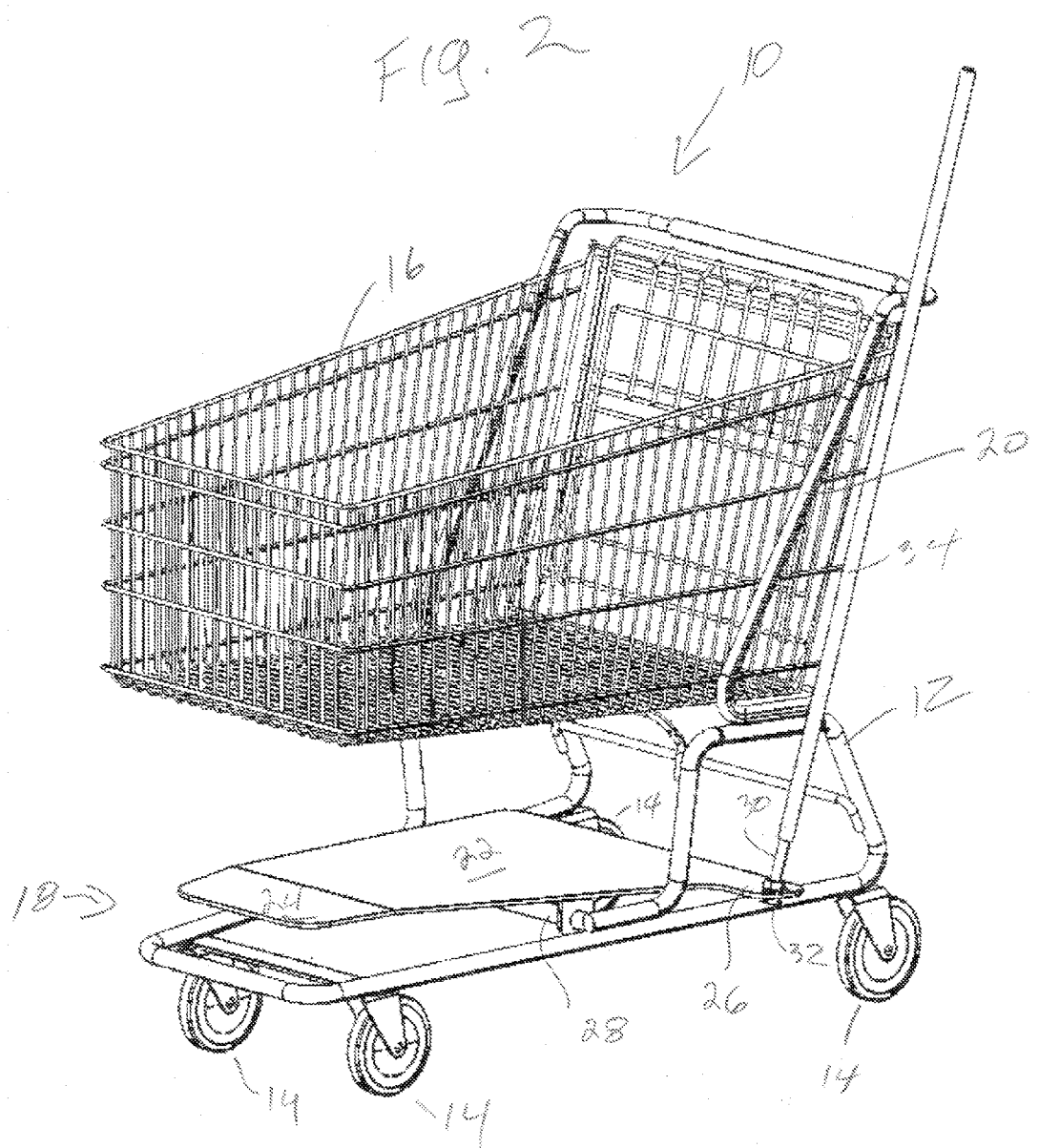
FIG. 2 is a perspective view of the shopping cart of FIG. 1.
Figure 3:
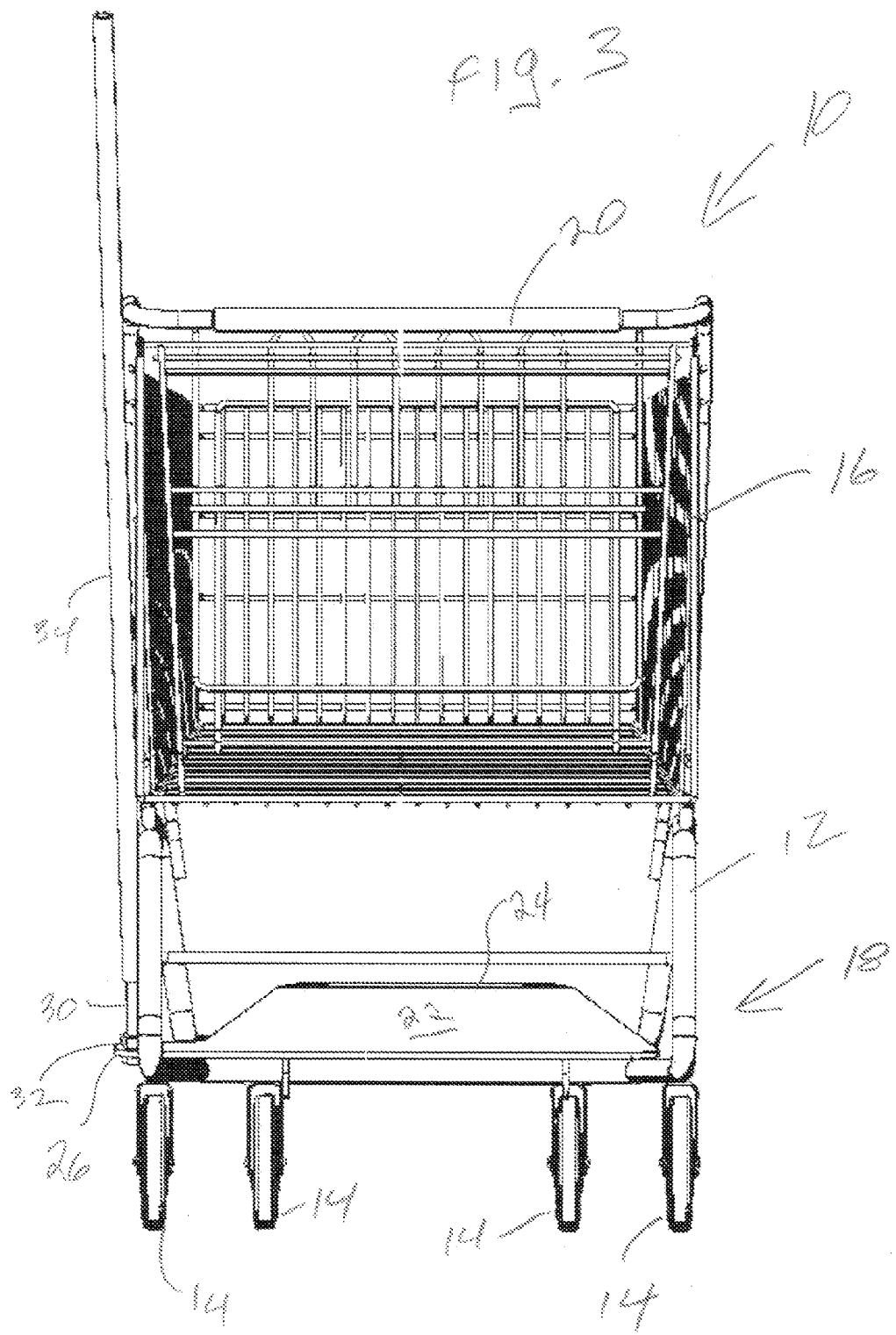
FIG. 3 is a rear view of the shopping cart of FIGS. 1 and 2.

From the foregoing, those skilled in the art will appreciate that the given weight of the piece 22 and/or the coupled indicator rod 30 causes the piece 22 to assume an angle (seen best in FIGS. 1 through 3) with one end, the front end with the bent portion 24, being the upper end of the piece 22 located above the pivot axis 28 and the other end with the extension 26 being the lower end of the piece 22 located at or below the pivot axis or simply lower than the upper end 24, the lower end being coupled to the rod 30 disposed in the sleeve 34. The length of the rod 30 and the sleeve 34 and the placement of them are such that the indicator portion 36 of the rod 30 is hidden inside the sleeve 34 when in a first indicating position as shown in FIGS. 1 through 3. That is to say that the floor member is in a first position and the rod is in a first indicating position.

Figure 4:
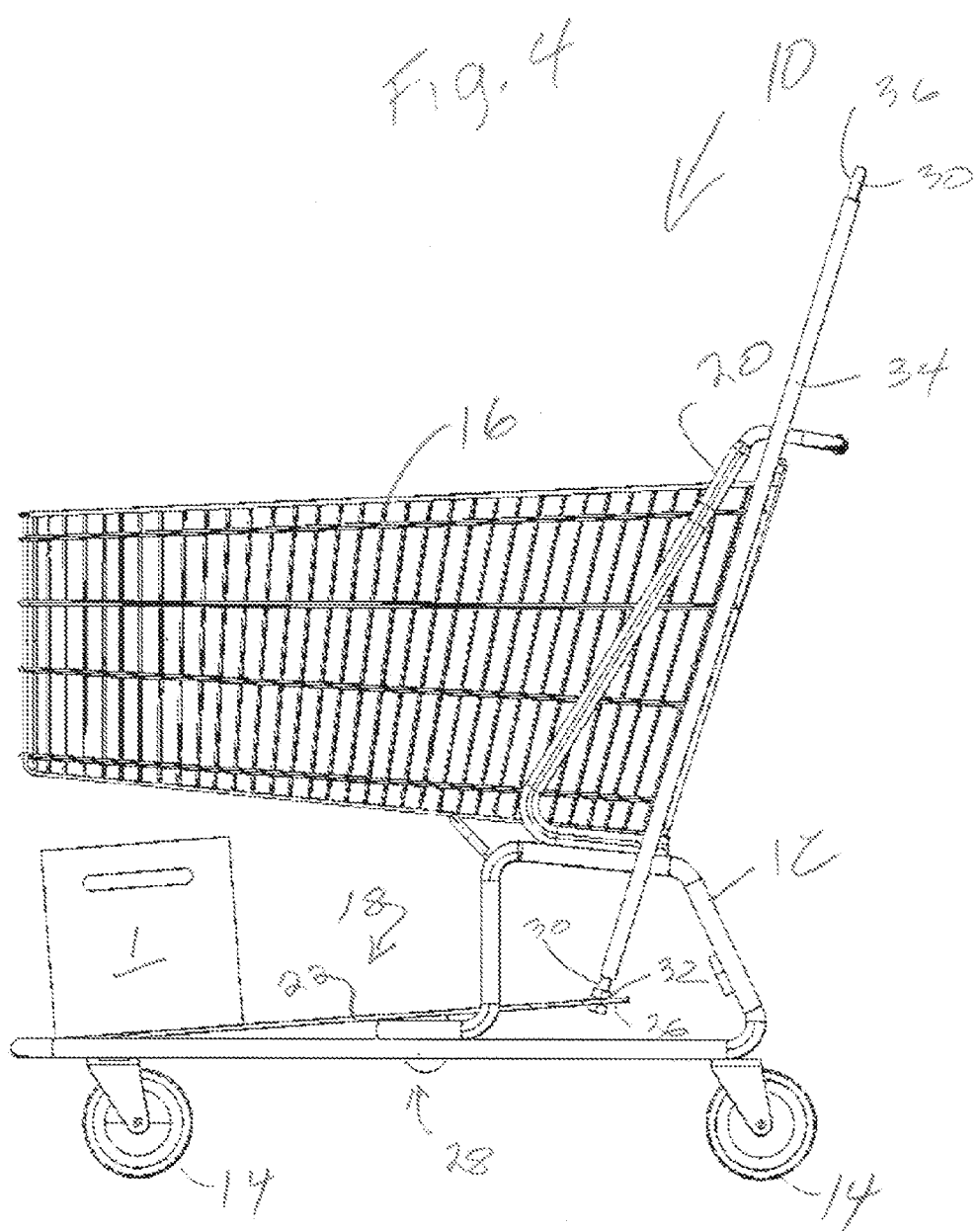
FIG. 4 is a view similar to FIG. 1 with a package on the bottom shelf.
Figure 5:
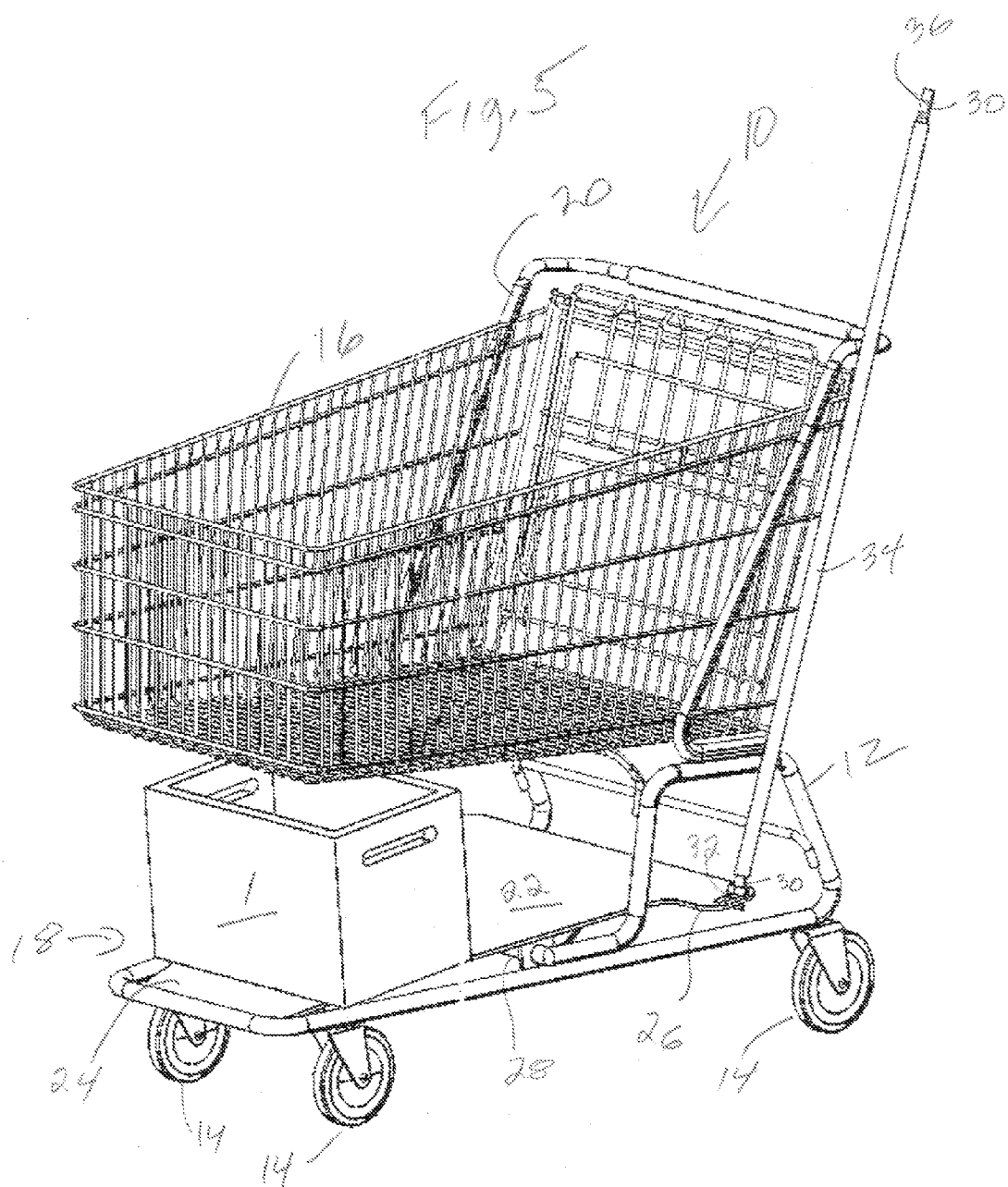
FIG. 5 is a view similar to FIG. 2 with a package on the bottom shelf.

When an object 1 is placed on the floor member 22, 24, the piece pivots on the pivot axis 28 and causes the floor member to assume a second position which causes the rod 30 to move through the sleeve 34 to a second indicating position as shown in FIGS. 4 and 5. Those skilled in the art will appreciate that the relative mass of the piece 22, the rod 30 and the object 1 as well as the coefficient of friction of the pivot axle(s) 28 should all be such that the invention operates as intended. In other words the mechanics of the invention should be designed so that objects 1 of expected mass will cause the indicator to move into the second indicating position.

It will be appreciated that the upper end of the sleeve 34 is arranged to be easily seen by a cashier at checkout and that the indicating position of the rod 30 can also be easily ascertained by the cashier to determine whether objects are present on the bottom shelf of the shopping cart.

Figure 6:
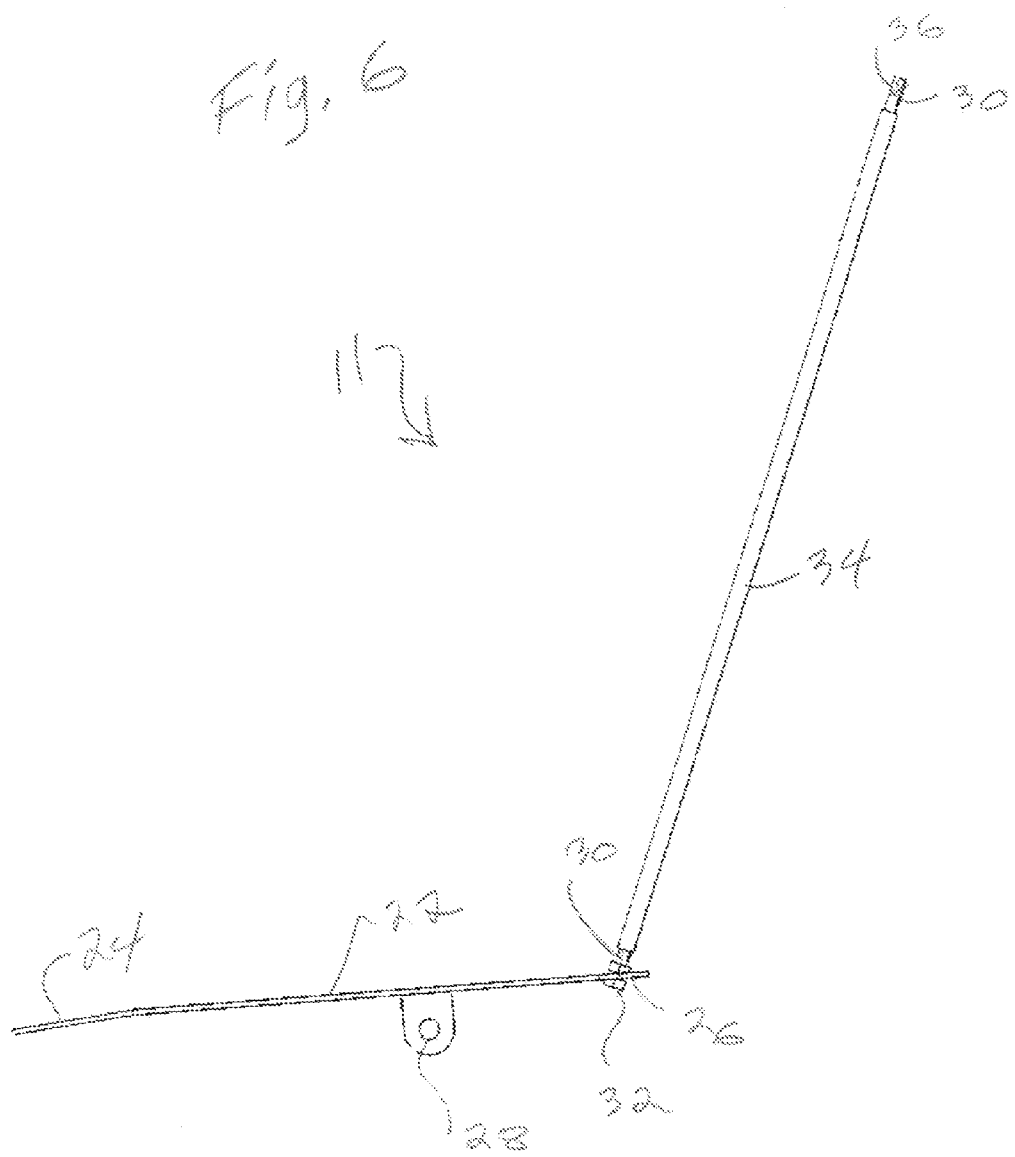
FIG. 6 is a side elevation view of the first embodiment of the invention without the shopping cart.

FIG. 6 illustrates the essential parts 11 of the first embodiment, namely the pivoting shelf 22, the rod 30, and the sleeve 34. These parts may easily be retrofitted to an existing shopping cart with the addition of one or more axles 28. Alternatively, it may be possible to find a shopping cart that has a cross member suitable for (or suitable to be adapted for) use as a pivot axle for the shelf 22.

Figure 7:
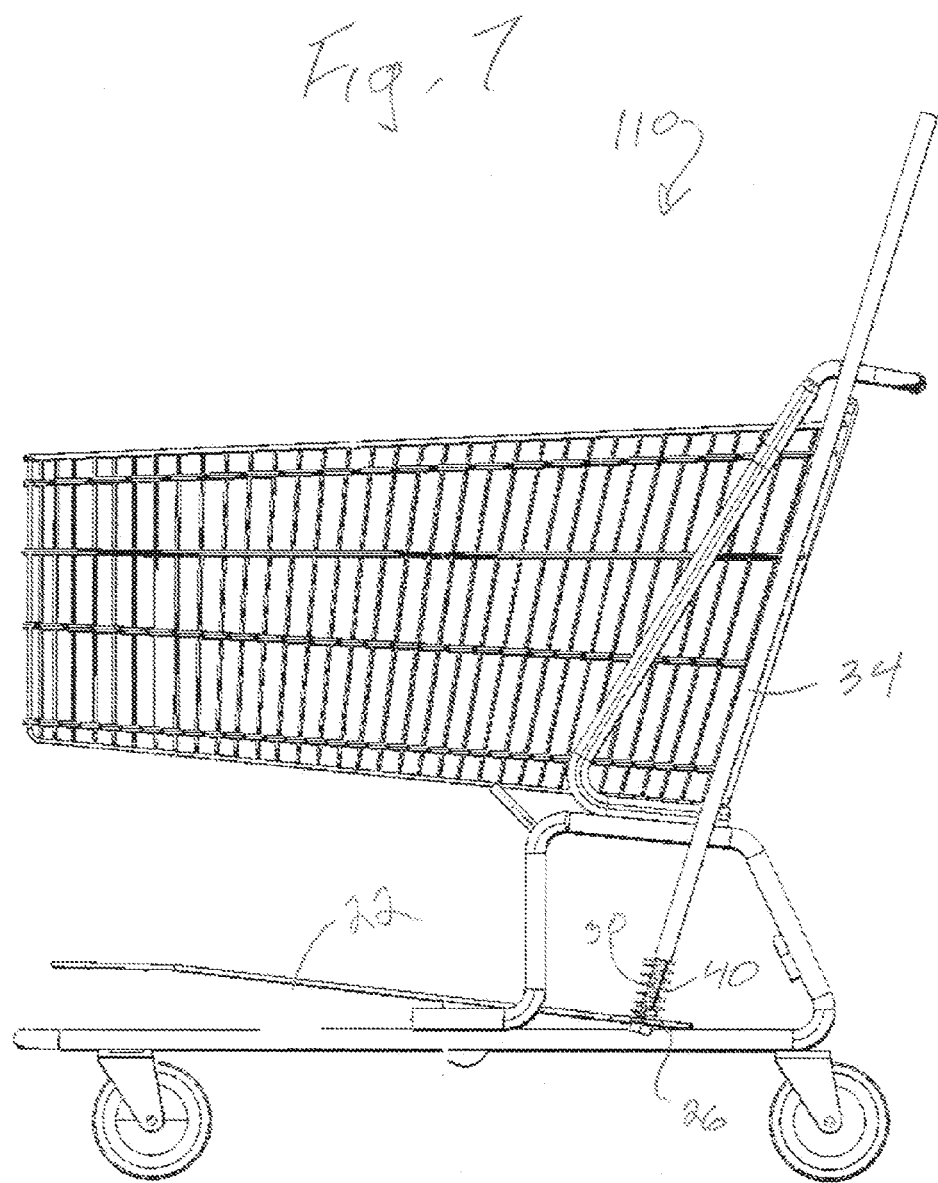
FIG. 7 is a view similar to FIG. 1 showing an alternate embodiment with a spring.

Turning now to FIG. 7, a second embodiment of the invention 110 is substantially identical to the first embodiment with one exception. In this embodiment, a spring 40 is added to help keep the piece 22 in the first position. As illustrated, the spring is a coaxial coil spring 40 which is disposed around the rod 30 between the sleeve 34 and the extension 26. This biases the floor member into the position shown in FIG. 7. It will be appreciated that the strength of the spring should be such that it does not interfere with the intended operation of the invention.

Figure 8:
FIG. 8 is a view similar to FIG. 2 illustrating an alternate embodiment with a reversal of indicator parts.

FIG. 8 shows another alternate embodiment of the invention 210 where the relative placement of the rod 30 and the sleeve 34 are interchanged. Here the sleeve 34 is coupled to the extension 26 of the piece 22 and the rod 30 is coupled to the pushing handle 20 or the frame 12 of the shopping cart. The rod 30 may be provided with an extension 31 at its upper end to effect this coupling.

Figure 9:
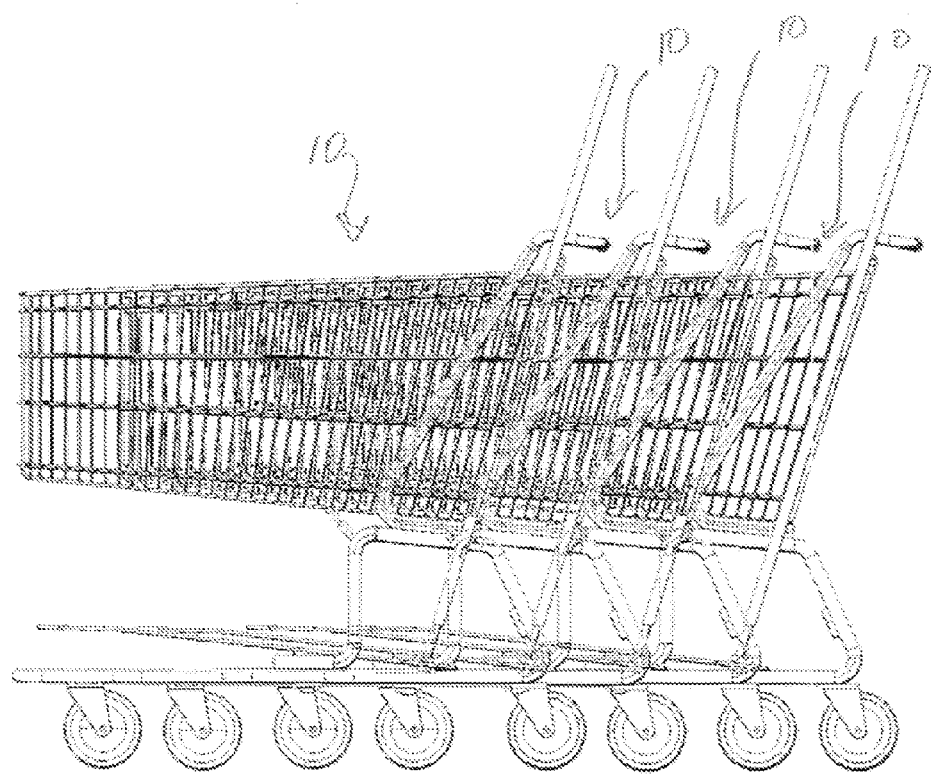
FIG. 9 is a view similar to FIG. 1 showing a plurality of carts incorporating the invention and stacked in a usual manner.

FIG. 9 shows four shopping carts 10 according to the invention stacked in a conventional manner. Those skilled in the art will appreciated that the addition of the invention to a conventional shopping cart will not interfere with this conventional stacking operation.

From the foregoing, those skilled in the art will appreciate that a method according to the invention is performed by a cashier at checkout. The indicator is observed to determine whether it is in the first or second indicating position signaling the presence or absence of one or more items on the bottom shelf of the cart. If the indicator signals the presence of one or more items, the cashier removes the item(s) or asks the customer to remove the item(s) for check out.

There have been described and illustrated herein several embodiments of a SHOPPING CART BOTTOM SHELF MONITOR. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A shopping cart, comprising:
a frame;
a plurality of wheels mounted to said frame;
a basket mounted to said frame above said wheels;
a bottom shelf located between said basket and said wheels, said bottom shelf comprising,
    a floor member pivotally mounted relative to said frame, said floor member being pivotally movable from a first position to a second position,
    a mechanical indicator coupled to said floor member, said indicator being mechanically movable from a first indicating position when said floor member is in said first position to a second indicating position when said floor member is in said second position, wherein
said mechanical indicator is completely operated by gravity without the need for a spring or similar biasing member.

2. The shopping cart according to claim 1, wherein:
said mechanical indicator is mounted to a rear member of said frame rather than to said basket.

3. The shopping cart according to claim 1, wherein:
said mechanical indicator is provided with visually perceptible indicia.

4. The shopping cart according to claim 3, wherein:
said indicia includes a colored stripe.

5. The shopping cart according to claim 1, further comprising:
a sleeve member coupled to said frame, wherein
said mechanical indicator includes a rod member movably disposed in said sleeve member.

6. The shopping cart according to claim 1, further comprising:
a rod member coupled to said frame, wherein
said mechanical indicator includes a sleeve member movably disposed about said rod member.

7. An assembly retrofittable on site onto an existing shopping cart, said assembly comprising:
a pivotable shelf movable from a first position to a second position; and
a mechanical indicator coupled to said shelf, said indicator being mechanically movable from a first indicating position when said shelf is in said first position to a second indicating position when said shelf is in said second position.

8. The assembly according to claim 7, wherein:
said assembly consists of fewer than ten parts.

9. The assembly according to claim 8, wherein:
said parts do not include a spring.

10. The assembly according to claim 9, wherein:
said mechanical indicator is provided with visually perceptible indicia that includes a colored stripe.

11. The assembly according to claim 7, wherein said shopping cart includes a basket and a frame with the basket attached to the frame, said assembly further comprising:
a sleeve member mountable directly to the shopping cart frame rather than the basket, wherein
said mechanical indicator includes a rod member movably disposed in said sleeve member, said rod member being operated by gravity without the use of a spring or similar biasing device.

12. The assembly according to claim 8, wherein:
said parts number no more than seven.

13. An assembly retrofittable on site to an existing shopping cart, the shopping cart having a frame and a basket connected to the frame, said assembly comprising:
a pivotable shelf movable from a first position to a second position;
a mechanical indicator coupled to said shelf, said indicator being mechanically movable from a first indicating position when said shelf is in said first position to a second indicating position when said shelf is in said second position,
said indicator including a sleeve and a rod movable through said sleeve solely with the aid of gravity and requiring no spring or similar biasing device, said sleeve being directly mountable to the frame rather than the basket,
said assembly consisting of no more than seven parts, none of which is a spring or similar biasing device.

14. An assembly according to claim 13, further comprising:
a shopping cart affixed with said assembly.

* * * * *